ns Patented Jan. 10, 1967

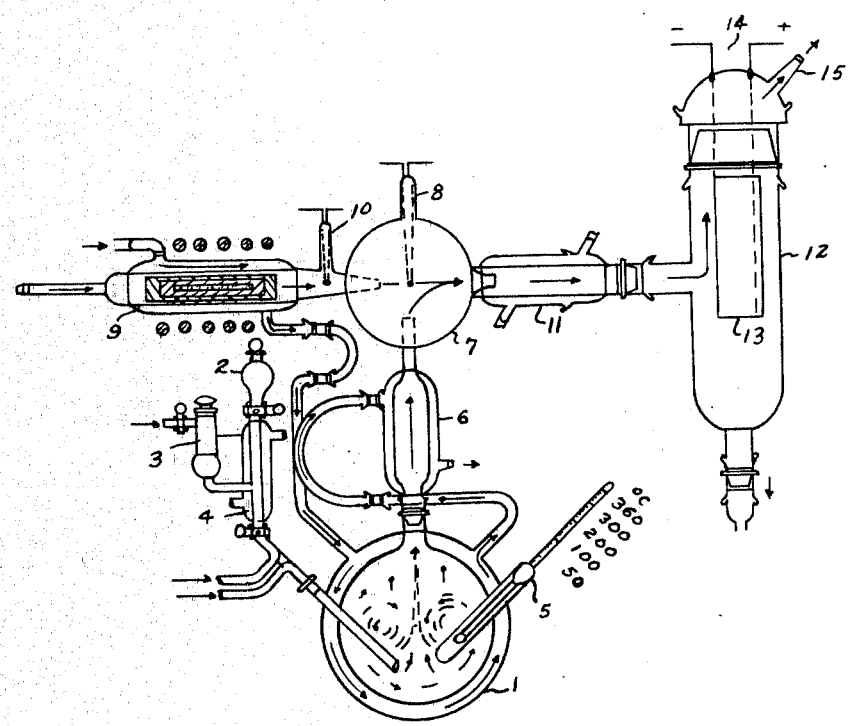

3,297,414
METHOD FOR MAKING HIGH PURITY FINE PARTICLE OXIDES
Khodabakhsh S. Mazdiyasni, Dayton, Charles T. Lynch, Fairborn, and Jerome J. Krochmal, Dayton, Ohio, assignors to the United States of America as represented by the Secretary of the Air Force
Filed June 30, 1964, Ser. No. 379,422
7 Claims. (Cl. 23—345)

The invention described herein may be manufactured and used by or for the United States Government for governmental purposes without the payment to any of us to any royalty thereon.

This invention relates to the production of metal oxides in the order of up to about 100 angstroms in diameter and of purity in excess of 99.9% by weight.

The problem solved by this invention and the object hereof is the making of extremely fine particles of metal oxides of extremely high purity. The usual methods of precipitation in the case of alkoxides by hydrolysis results in products of lesser purities and average particle sizes that are ten times larger than the particles that are produced by the process that is disclosed herein. Work in this general field done for the Standard Oil Company, is disclosed in the patents numbered 2,656,321, 2,593,314 and 2,570,058.

This invention in brief is directed to the making of ultrahigh purity in excess of 99.9% by weight, metal oxide particles of extremely small size below 100 angstroms in diameter. The particles are made by causing the decomposition of selected metal-organic compounds in the vapor phase without the use of any heated or catalytic substrate. The products are used as catalysts, as absorbents, as refractory oxide bodies for use in high temperature environments, as heat shields, leading edges of wings, as rocket nozzle liners, as thermal and electrical insulators, as nose cone materials, as ceramic electronic device parts, and the like.

A preferred apparatus that is used in the process that embodies the present invention, is shown in the single figure of the accompanying drawing.

The apparatus in which the reaction here of interest principally occurs, is a round bottom double walled flask 1, that is heated by an infrared lamp, heating mantle or the like, not shown.

In practicing the process, a desired alkoxide, of which zirconium tetratertiary butoxide or $Zr(OC_4H_9)_4$, may be taken as being illustrative, in its liquid physical state, is positioned in its container 2, that is valved into the flask 1. Pressurized inert gas is passed through the drying tower 3 into an inert gas preheater 4, where it picks up and serves as a carrier gas for the alkoxide that is supplied from its container 2 where within the preheater 4 the alkoxide is partially vaporized by heat. In some cases it is not necessary to preheat the alkoxide and the alkoxide liquid and the dry inert gas are added directly to flask 1. The alkoxide mixture of liquid and vapor is then borne by the carrier gas and is valved at a controlled flow rate through a flow meter, not shown, and is discharged inside of and adjacent to the bottom of the inner flask of the double walled flask 1. The temperature within the inner flask of the double walled flask 1 is indicated by the thermometer 5. Where preferred, all of the heating may be done within the flask 1, within the scope of this invention.

The reactants within the inner flask of the double walled flask 1, are maintained at their refluxing temperature with their vapors rising upwardly through an extension chamber 6 into the decomposition chamber 7. The decomposition chamber 7 temperature at about the center of the chamber is indicated by suitable means, such as by the platinum-13% rhodium thermocouple 8.

The decomposition chamber 7 is supplied with nitrogen that is preheated by an induction heater 9 to a temperature that is indicated by another platinum-13% rhodium thermocouple 10. At the point of intersection of the hot gas and the alkoxide vapor with its carrier gas the alkoxide decomposes to the oxide, olefin, and alcohol. The induction heater 9 also heats by thermal conduction clean air to a desired temperature and the heated air is circulated to pass between the double walls of the reactants containing flask 1 and between the extension chamber 6 and its enclosing sleeve, from which sleeve the hot air is released.

The decomposition chamber 7 is vented through a condenser tube 11, through the sleeve of which a temperature controlling fluid is circulated, into the Pyrex electrostatic precipitator 12. The electrostatic precipitator 12 contains a deposition plate 13 that is energized from a power source 14. The energized plate 13 causes the zirconium oxide formed in the process as the desired product, to fall out of the bottom of the electrostatic precipitator into a container, not shown. The vaporous and gaseous byproducts pass out of the precipitator 12 by the connection 15, for recovery or as waste, as preferred. When preferred, instead of the precipitator the collector device can be anything to collect fine particulate oxides such as a series of baffle plates or solutions or other mechanical, electrical, or chemical means. The walls of the decomposition chamber 7 and the walls of the condenser tube 11 also provide collection surfaces.

The primary alkoxide vaporizer or preheater 4 is maintained at or close to the boiling point of the zirconium tetratertiary butoxide, chosen here as the illustrative example, or at about 150–210° C. at 760 mm. Hg. The inert carrier gas sweeps the vapor and the hot liquid from the primary vaporizer operation into the round bottom flask 1, which serves as a secondary vaporizer, where the remaining liquid is vaporized. Hot inert gas preheated to 325–500° C. by the preheater 9, is directed to the center of the decomposition chamber 7. At the mixing of the hot gas and the alkoxide vapor, the alkoxide vapor decomposes to the oxide, an olefin and alcohol. The orifices are designed to permit precise flow and mixing control. The alcohol and the olefin preferably are cold trapped out of the gas stream flowing from the precipitator 12 and thus are recovered.

Powders obtained by this method as zirconium oxide, analyzed 99.9% purity, with an average particle size of less than 100 angstroms as determined by electron microscopy.

The process that is disclosed herein is applicable to any volatile alkoxide since all of the alkoxides thermally decompose to the oxides. The carrier gas is a dry inert gas. The carrier gas illustratively may be nitrogen, argon, helium or the like. The hot gas heated in chamber 9 and entering decomposition chamber 7 can be an inert gas such as nitrogen, argon, helium and the like. Oxygen also may be used as the hot gas, since the desired product is an oxide.

The round bottom flask 1 is preferred, although the process is applicable to other containers, as will be apparent. An induction heated platinum foil furnace is suitable as preheater 9 for the hot gas. Other types of furnaces may be used providing contaminants are not introduced into the inert gas stream.

All glassware and the inert gas must be very dry, because the alkoxides react rapidly with water. It is important that the decomposition reaction be done entirely in the vapor phase. This is believed to be the key to the success of forming the very fine particles.

The transition and rare earth metals as defined by the IUPAC (International Union of Pure and Applied Chemistry) are particularly applicable to the forming of volatile alkoxides, which are decomposed into oxides. These metals include titanium, zirconium, hafnium, thorium, yttrium, dysprosium, and ytterbium. In addition selected members of Groups II–A, III–A, and IV–A elements of which illustrations are magnesium, beryllium, strontium, boron, aluminum, silicon and germanium form alkoxides which are decomposed by this process into high purity, fine particle oxides. The alkoxides are compounds that illustratively contain the alkyl group which are commonly n-propyl, sec-propyl; n-, sec-, and t-butyl; n-, sec-, and t-amyl; and higher order groups such as hexyl and heptyl.

Applicable alkoxides may be either liquids or solids with boiling or sublimation temperatures below their respective decomposition temperatures. Mixed oxides can be made by the decomposition of mixed alkoxides which have compatible volatilization characteristics.

The reactions that are illustrative of the present invention are:

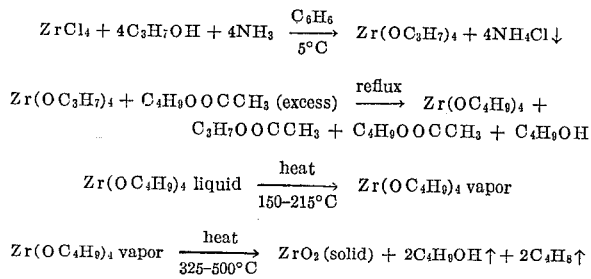

It is to be understood that modifications may be made in the apparatus and in the process that are disclosed herein, within the limits of equivalent chemical practices for the attainment of comparable results, without departing from the spirit and the scope of the present invention as defined by the appended claims.

We claim:

1. In the method of making extremely fine metallic oxides of high purity in excess of 99.9% by weight and having an average diameter of about 100 angstroms and less comprising the steps of refluxing an alkoxide having from 3 to 7 carbon atoms of a metal selected from the group consisting of titanium, zirconium, hafnium, thorium, yttrium, dysprosium, ytterbium, magnesium, beryllium, strontium, boron, aluminum, silicon, and germanium with an inert carrier gas so as to vaporize the alkoxide, thereafter thermally decomposing the alkoxide of the mixed alkoxide and carrier gas to the corresponding metallic oxide by means of a dry preheated gas inert to the carrier gas, and then collecting the metallic oxide formed.

2. The method of making extremely fine metallic oxides of high purity in excess of 99.9% by weight and having an average diameter of about 100 angstroms and less comprising the steps of refluxing an alkoxide having from 3 to 7 carbon atoms of a metal selected from the group consisting of titanium, zirconium, hafnium, thorium, yttrium, dysprosium, ytterbium, magnesium, beryllium, strontium, boron, aluminum, silicon, and germanium with an inert carrier gas so as to vaporize the alkoxide, intimately mixing said carrier gas and alkoxide, thereafter thermally decomposing the alkoxide of the mixed alkoxide and carrier gas to the corresponding metallic oxide by means of a dry preheated gas inert to the carrier gas, and then collecting the metallic oxide formed.

3. The method of making extremely fine metallic oxides of high purity in excess of 99.9% by weight and having an average diameter of about 100 angstroms and less comprising the steps of refluxing an alkoxide having from 3 to 7 carbon atoms of a metal selected from the group consisting of titanium, zirconium, hafnium, thorium, yttrium, dysprosium, ytterbium, magnesium, beryllium, strontium, boron, aluminum, silicon, and germanium with an inert carrier gas so as to vaporize the alkoxide, intimately mixing said carrier gas and alkoxide, thereafter thermally decomposing the alkoxide of the mixed alkoxide and carrier gas to the corresponding metallic oxide by means of a dry preheated gas inert to the carrier gas, and then collecting the metallic oxide formed by electrostatic precipitation.

4. The method of claim 3 in which the metal of the alkoxide is zirconium.

5. The method of claim 3 in which the preheated gas is selected from the group consisting of nitrogen, argon, helium, and oxygen.

6. The method of claim 3 in which the metal of the oxide is selected from the group consisting of zirconium, titanium and hafnium.

7. The method of claim 3 in which the dry preheated gas is at a temperature of about 325 to 500° C.

References Cited by the Examiner
UNITED STATES PATENTS 2,754,176    7/1956    Kimberlin _____ 23—142
2,968,537    1/1961    Nixon.
3,148,027    9/1964    Richmond _____ 23—140 X CARL D. QUARFORTH, *Primary Examiner.*

BENJAMIN R. PADGETT, L. DEWAYNE RUTLEDGE, *Examiners.*

S. TRAUB, *Assistant Examiner.*